(12) United States Patent
Ahn et al.

(10) Patent No.: US 7,992,254 B2
(45) Date of Patent: Aug. 9, 2011

(54) CASTER DEVICE

(75) Inventors: Hyoung Kyoun Ahn, Seoul (KR); Ghi Young Kim, Seoul (KR)

(73) Assignee: Medison Co., Ltd., Kangwon-do (KR)

( * ) Notice: Subject to any disclaimer, the term of this patent is extended or adjusted under 35 U.S.C. 154(b) by 0 days.

(21) Appl. No.: 12/621,944

(22) Filed: Nov. 19, 2009

(65) Prior Publication Data
US 2010/0122430 A1   May 20, 2010

(30) Foreign Application Priority Data

Nov. 20, 2008 (KR) .................. 10-2008-0115754
Nov. 3, 2009 (KR) .................. 10-2009-0105376

(51) Int. Cl.
*B60B 33/00* (2006.01)
(52) U.S. Cl. .................................................. 16/35 R
(58) Field of Classification Search .............. 16/35 R, 16/35 D; 188/1.12; 280/86.757; 5/86.1
See application file for complete search history.

(56) References Cited

U.S. PATENT DOCUMENTS

| | | | |
|---|---|---|---|
| 3,363,725 A * | 1/1968 | Lorrance ............... | 188/2 R |
| 3,431,584 A * | 3/1969 | Maslow ................ | 16/35 R |
| 4,410,194 A * | 10/1983 | Steilen ................ | 280/86 |
| 4,526,253 A | 7/1985 | Schmidt | |
| 5,774,936 A * | 7/1998 | Vetter ................. | 16/35 R |
| 6,520,460 B2 * | 2/2003 | Hallberg et al. ....... | 248/188.5 |
| 6,598,247 B1 * | 7/2003 | Heimbrock et al. ..... | 5/86.1 |
| 7,200,894 B2 * | 4/2007 | Block et al. .......... | 16/18 R |

FOREIGN PATENT DOCUMENTS

| | | |
|---|---|---|
| DE | 4318546 A1 | 12/1994 |
| EP | 1810652 A2 | 7/2007 |
| GB | 1438530 | 6/1976 |
| WO | WO 2004/080363 A2 | 9/2004 |

* cited by examiner

*Primary Examiner* — Victor Batson
*Assistant Examiner* — Matthew Sullivan
(74) *Attorney, Agent, or Firm* — McDermott Will & Emery LLP (57) ABSTRACT

There is provided a caster device including a caster, a crank shaft, a rotating member, a pushing member and a connecting rod. The crank shaft is coaxially coupled to a reciprocatingly rotatable cam element of the caster. The rotating member is rotatably coupled to a movable object. The rotating member has a plurality of pins spaced apart from one another in a circumferential direction. The pushing member is vertically movably coupled to the movable object. The pushing member rotates the rotating member by contact with the pin. The connecting rod and the crank shaft convert a rotation of the rotating member to a reciprocating rotation of the cam element. The caster is set to one of a plurality of operating modes according to the reciprocating rotation of the cam element.

11 Claims, 12 Drawing Sheets

CASTER DEVICE

The present application claims priority to Korean Patent Application No. 10-2008-0115754 filed on Nov. 20, 2008 and Korean Patent Application No. 10-2009-0105376 filed on Nov. 3, 2009, the entire disclosure of which are incorporated herein by reference.

TECHNICAL FIELD

The present disclosure relates to a caster device, which is coupled to a movable object such as a medical appliance, a removable bed and the like.

BACKGROUND

An equipment or cart designed to carry articles has a plurality of casters. Typically, a caster includes a base coupled to a lower side of the equipment or cart, and a wheel coupled to the base via a wheel arm. The caster may be classified into a swivelable caster, which allows the wheel arm to swivel relative to the base, and a non-swivelable caster that does not allow the wheel arm to swivel relative to the base. A user can change a moving direction of the equipment or cart with the swivelable caster by swiveling the wheel arm. To keep the equipment or cart fixed in place, the caster may include an actuating part for selectively locking and unlocking the wheel or wheel arm.

As one example of said equipment or cart, there is known in the art a removable bed or medical appliance utilized in medical facilities. The removable bed or medical appliance must either freely move or be immobilized within the medical facilities. As such, the medical appliance or removable bed may have the above-described casters. However, to move or immobilize the medical appliance or removable bed, each of the actuating parts of the casters must be manipulated, thereby causing inconvenience or difficulty during movement or immobilization. Particularly, during emergency situations, there is a problem in that such inconvenience or difficulty hinders treatment. Also, when using a caster with actuating parts individually provided according to operating modes, there is a further problem in that the user can be confused as to the operating mode associated with each of the actuating parts.

SUMMARY

Various embodiment of a device for controlling a caster coupled on a movable object are provided. The caster device may comprise the following: a caster including a reciprocatingly rotatable cam element, the caster being coupled to a movable object; a crank shaft coupled to the cam element; a rotating member rotatably coupled to the movable object, the rotating member having a plurality of pins spaced apart from one another along a circumferential direction; a pushing member for rotating the rotating member, the pushing member being vertically movably coupled to the movable object; and a connecting rod for connecting the crank shaft and the rotating member. The connecting rod and the crank shaft may convert rotation of the rotating member caused by movement of the pushing member into reciprocating rotation of the cam element.

The pushing member may include a pushing plate having a first contact surface and a second contact surface. The first contact surface may be brought into contact with one of the pins during downward movement of the pushing member.

The second contact surface may be brought into contact with one of the pins during upward movement of the pushing member.

The pushing plate may include a vertical portion and a horizontal portion extending from the vertical portion.

The second contact surface may comprise an upper flat surface and a tapered surface.

The pushing member may further include a spring for biasing the pushing plate towards the rotating member.

The pushing member may further include: a guide rod vertically movably disposed at the movable object; and a compression spring disposed around the guide rod.

The pushing member may be hinge-jointed to the movable object.

The pushing member may include a pivotal bar pivotally coupled to the movable object and having first and second contact surfaces. The first contact surface may be brought into contact with one of the pins during downward movement of the pushing member. The second contact surface may be brought into contact with one of the pins during upward movement of the pushing member.

The caster device may further comprise a spring disposed between the movable object and the pivotal bar for biasing the pivotal bar upwardly.

The pins may be retractably mounted to the rotating member. Each of the pins may include a tapered surface contacting the pushing member at a top end thereof.

The pushing member may include a pedal plate, wherein the pushing plate is pivotally coupled to the pedal plate.

The caster may further include a push rod configured to be vertically moved at different levels in a plurality of operating modes according to the rotation of the cam element.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Arrangements and embodiments may be described in detail with reference to the following drawings in which like reference numerals refer to like elements and wherein.

DETAILED DESCRIPTION

A detailed description may be provided with reference to the accompanying drawings. One of ordinary skill in the art may realize that the following description is illustrative only and is not in any way limiting. Other illustrative embodiments may readily suggest themselves to such skilled persons having the benefit of this disclosure.

Figure 1:
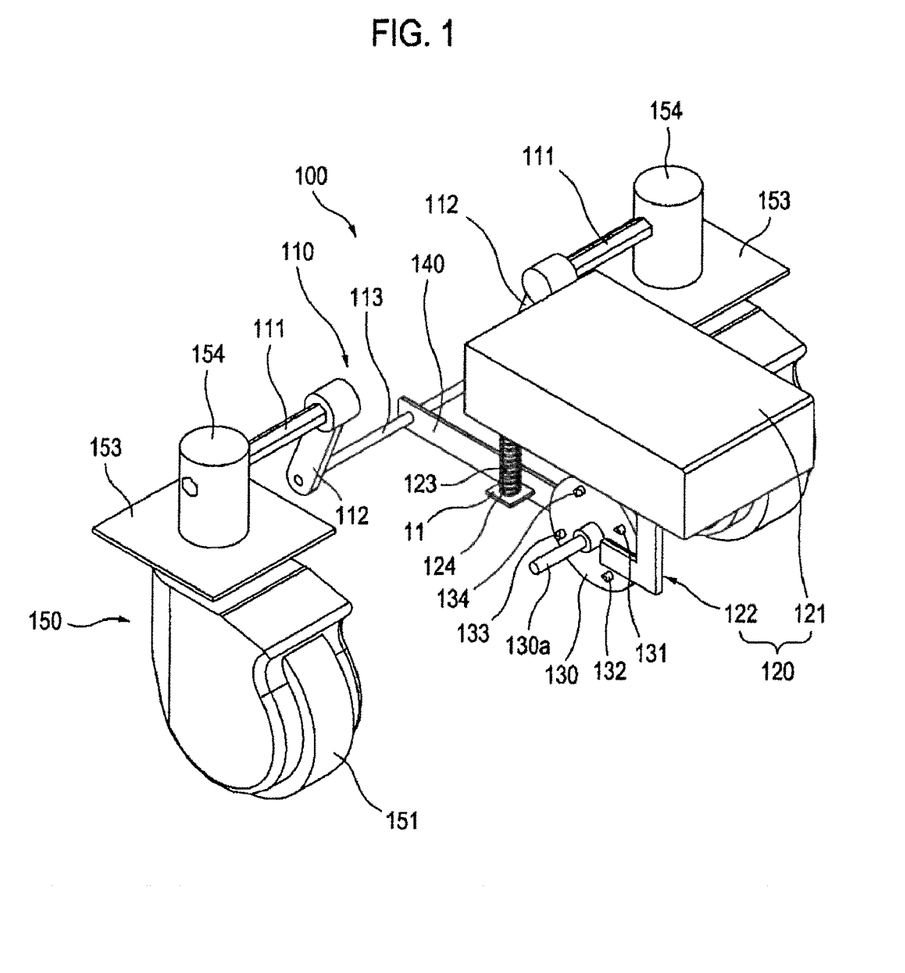
FIG. 1 is a perspective view showing a caster device according to a first embodiment of the present disclosure.
Figure 2:
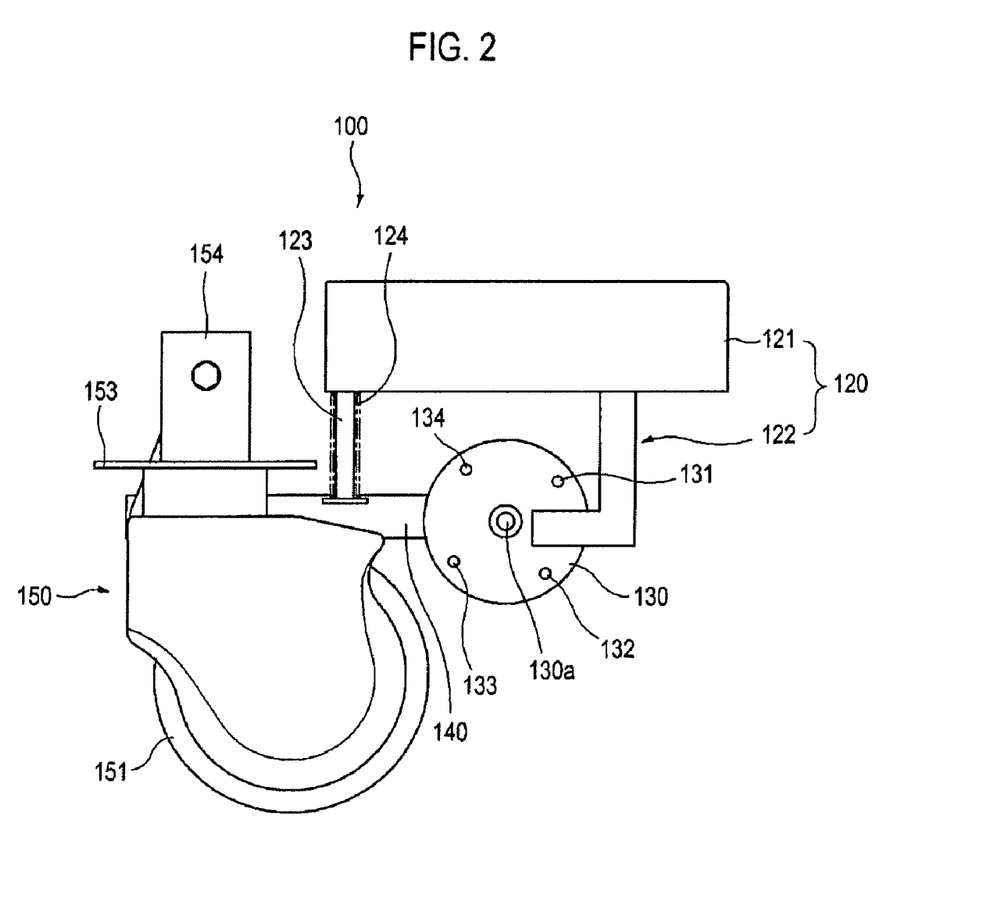
FIG. 2 is a right side elevational view of the caster device shown in FIG. 1.
Figure 3:
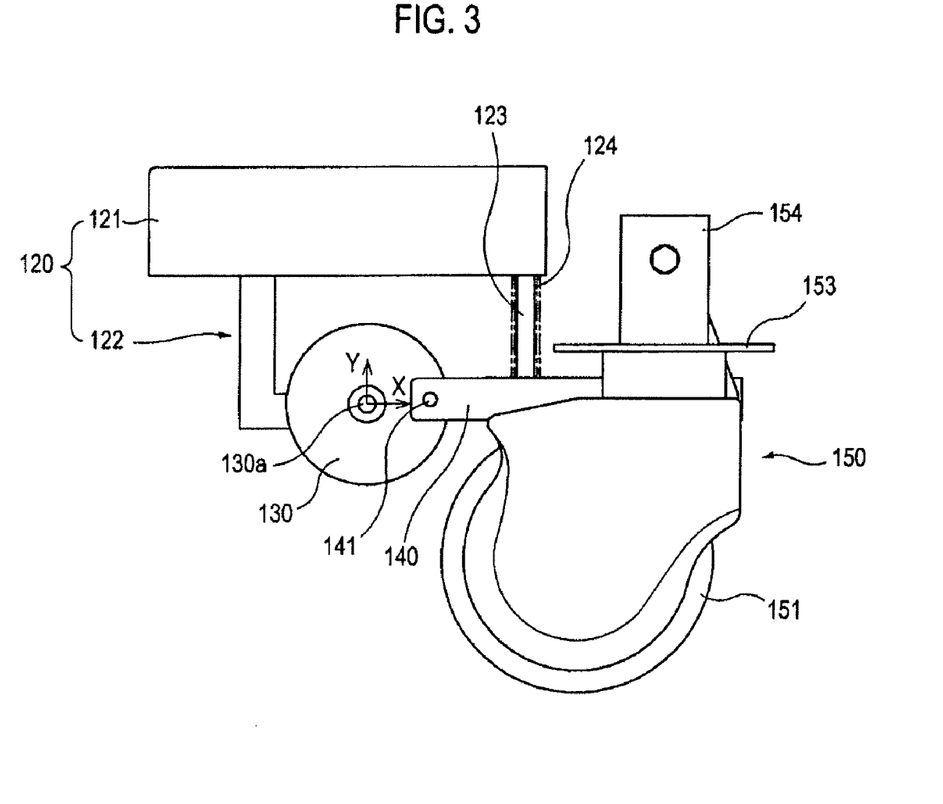
FIG. 3 is a left side elevational view of the caster device shown in FIG. 1.
Figure 4:
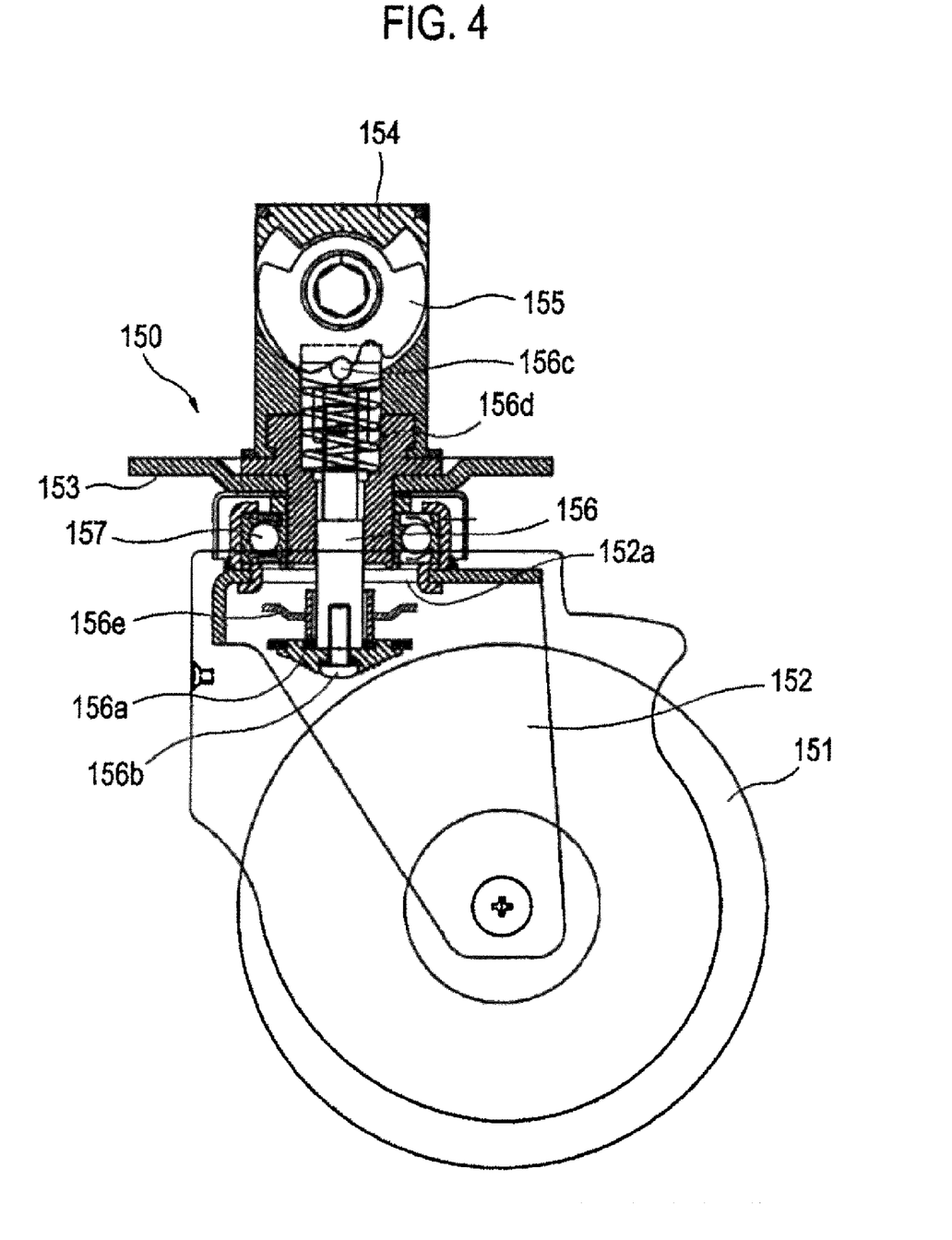
FIG. 4 is a sectional view of a caster shown in FIG. 1.
Figure 5:
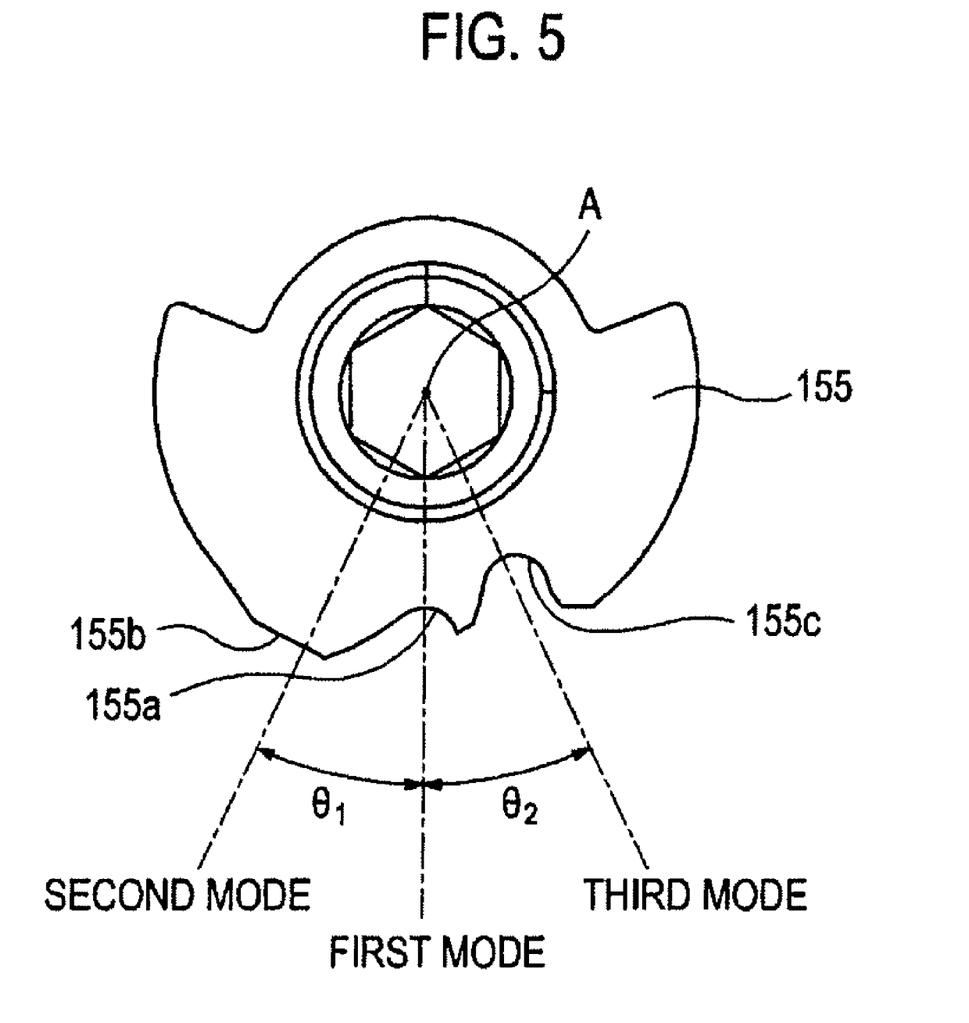
FIG. 5 shows a cam element and operating modes of the caster shown in FIG. 4.

FIG. 1 is a perspective view showing a caster device according to a first embodiment of the present disclosure. FIG. 2 is a right side elevational view of the caster device shown in FIG. 1. FIG. 3 is a left side elevational view of the caster device shown in FIG. 1. FIG. 4 is a sectional view of a caster shown in FIG. 1. FIG. 5 shows a cam element and operating modes of the caster shown in FIG. 4.

Referring to FIGS. 1 to 5, a caster device 100 according to a first embodiment of the present disclosure may comprise: a crank shaft 110; a pushing member 120; a rotating member 130; a connecting rod 140; and a caster 150. The caster device 100 may be coupled to a movable object (not shown) to support and move the movable object. The caster device 100 may be set to one of a plurality of operating modes by reciprocatingly rotating a cam element 155 of the caster 150. The movable object, to which the caster device 100 is coupled, may include, but is not limited to, a removable bed and a medical appliance such as an ultrasonic diagnostic apparatus. Further, the movable object may be any movable object, to which the caster device 100 can be coupled, such as a cart designed to carry articles.

The crank shaft 110 may comprise the following: a connecting shaft 111 coaxially connected or coupled to the cam element 155 of the caster 150 at one end thereof; a crank arm 112 coupled to an opposite end of the connecting shaft 111 at one end thereof; and a crank pin 113 coupled to an opposite end of the crank arm 112 and connected to the connecting rod 140. The connecting rod 140 may be pivotally coupled to the crank pin 113 at its one end and to the rotating member 130 at its opposite end.

The pushing member 120 may be vertically movably coupled to the movable object. In this embodiment, the pushing member 120 may include a pedal plate 121. Further, the pushing member 120 may include a guide rod 123 and a compression spring 124 to be vertically and resiliently movable. The guide rod 123 may be disposed at a central portion of the pedal plate 121 or at front and rear sides of the pedal plate 121. A bracket 11 for guiding and supporting the guide rod 123 may be provided at the movable object. The guide rod 123 may be fixed to the pedal plate 121 at its one end and may be movably coupled to the bracket 11 at its opposite end. The compression spring 124 may be disposed around the guide rod 123 between the pedal plate 121 and the bracket 11. If a user pushes the pushing member 120 downwardly (e.g., if the user steps on the pedal plate 121), then the guide rod 123 may move downwardly together with the pedal plate 121 as the compression spring 124 is compressed therealong. The guide rod 123 may have a stopper (not shown) at its opposite end so as not to be separated from the bracket 11.

The caster 150 may be coupled to a lower side of the movable object. Referring to FIGS. 4 and 5, the caster 150 may comprise the following: a wheel 151; a wheel arm 152 supporting the wheel 151; a wheel base 153 coupled to the movable object and relatively rotatably coupled to the wheel arm 152; an actuating part 154 fixed on the wheel base 153; a cam element 155 reciprocatingly rotatably coupled to the actuating part 154 for converting the operation modes; and a push rod 156 vertically movable according to the operation modes. A bearing 157 may be disposed between the wheel arm 152 and the wheel base 153. Further, a rubber pad 156a may be attached to a lower end side of the push rod 156 by means of a fastening member 156b, while a contact portion 156c contacting a periphery of the cam element 155 may be provided at an upper end side of the push rod 156. A compression spring 156d may be disposed between the contact portion 156c and the actuating part 154 to bias the contact portion 156c towards the cam element 155. Also, an engagement piece 156e may be integrally attached to the push rod 156 above the rubber pad 156a, while a recess 152a, to which the engagement piece 156e is selectively engaged, may be formed in the wheel arm 152. As shown in FIG. 5, the cam element 155 may have first to third cam surfaces 155a, 155b, 155c on its periphery, each of which is sized in a radial direction from a rotating axis A. Since the contact portion 156c of the push rod 156 contacts the cam surfaces 155a, 155b, 155c of the cam element 155 under the biasing force of the compression spring 131d, the push rod 156 may be vertically and resiliently movable due to the reciprocating rotation of the cam element 155 about the rotating axis A. In an example embodiment illustrated in the figures, the first and third cam surfaces 155a, 155c may be concavely shaped, while the second surface 155b may be flat. However, the number of cam surfaces of the cam element 155 and each cam profile of the cam surfaces may be diversely designed depending on the operation modes of the caster 150.

The above-described caster 150 may operate in first to third modes. In the first mode, the contact portion 156c may be engaged to the first cam surface 155a of the cam element 155, while the engagement piece 156e may be separated from the recess 152a. Thus, the wheel arm 152 of the caster 150 may swivel or rotate to change the moving direction and the wheel 151 may rotate. In the second mode, the contact portion 156c may contact the second cam surface 155b of the cam element 155, while the push rod 156 may move downwardly to bring the rubber pad 156a into contact with the periphery of the wheel 151. As such, the wheel 151 of the caster 150 may not rotate. In the third mode, the contact portion 156c may be engaged to the third cam surface 155c of the cam element 155, while the engagement piece 156e may be engaged to the recess 152a. Thus, the wheel arm 152 of the caster 150 may not swivel or rotate and the wheel 151 may rotate.

Figure 6:
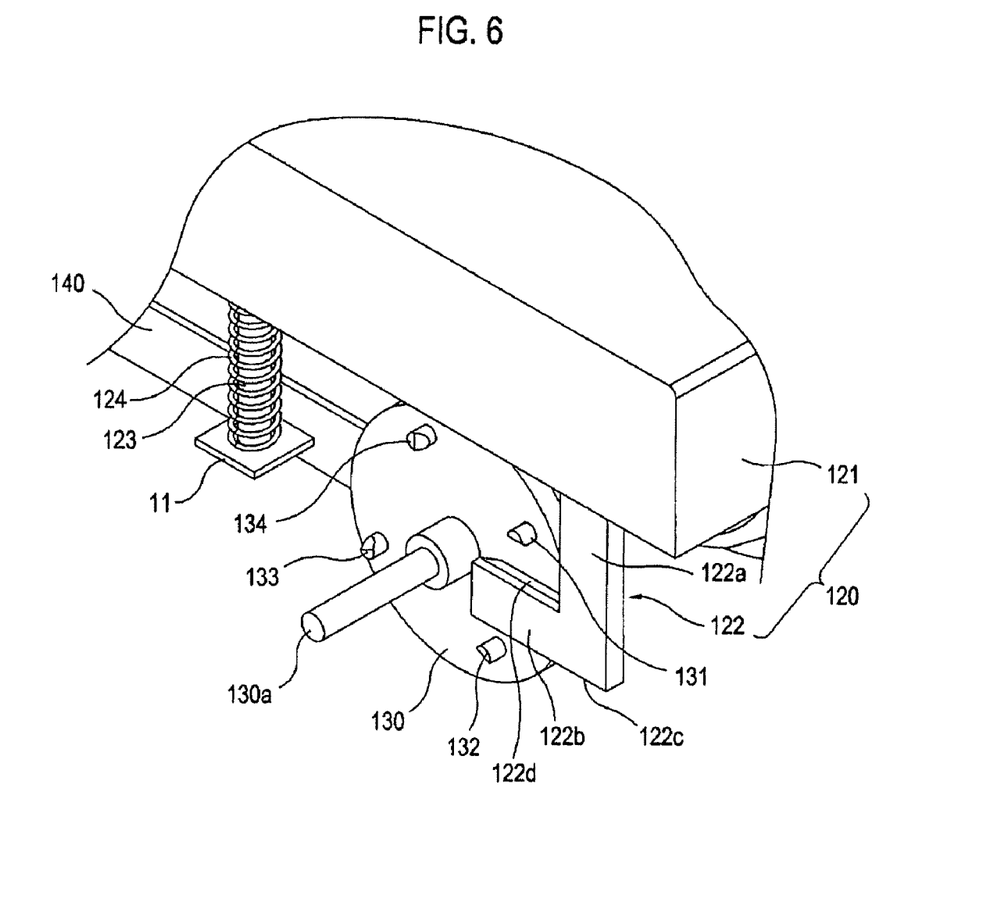
FIG. 6 is a partially enlarged perspective view of the caster device shown in FIG. 1.
Figure 7:
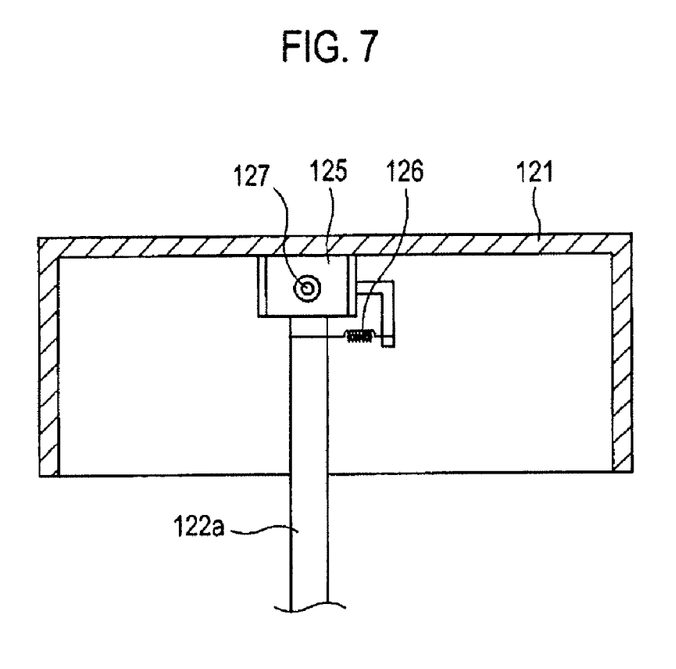
FIG. 7 is a schematic view showing a coupling arrangement between a pedal plate and a pushing plate.

FIG. 6 is a partially enlarged perspective view of the caster device shown in FIG. 1. FIG. 7 is a schematic view showing a coupling arrangement between a pedal plate and a pushing plate.

The pushing member 120 may further include a pushing plate 122 for rotating the rotating member 130 by a downward movement thereof. In this embodiment, the pushing plate 122 is coupled to the pedal plate 121 to be vertically movable together with the pedal plate 121. In an example shown in the figures, the pushing plate 122 may include: a vertical portion 122a coupled to the pedal plate 121 at its one end; and a horizontal portion 122b extending from the vertical portion 122a.

Referring to FIG. 6, the pushing plate 122 may have first and second contact surfaces 122c, 122d, which contact pins 131, 132, 133, 134 of the rotating member 130. The first contact surface 122c may contact the pins 131, 132, 133, 134 during the downward movement of the pushing member 120, while the second contact surface 122d may contact the pins 131, 132, 133, 134 during the upward movement of the pushing member 120. In this embodiment, the first contact surface 122c may comprise a lower edge of the horizontal portion 122b. The first contact surface 122c may contact the pins 131, 132, 133, 134 to move the pins 131, 132, 133, 134 downwardly. The second contact surface 122d may comprise an upper flat surface and a tapered surface.

The pushing plate 122 may be pivotally coupled to the pedal plate 121 as biased towards the rotating member 130. For example, as shown in FIG. 7, the vertical portion 122a of the pushing plate 122 is coupled to a supporting bracket 125, which is attached a lower side of the pedal plate 121, via a pivot shaft 127. A tension spring 126 is interposed between the vertical portion 122a and the supporting bracket 125 for biasing the vertical portion 122a towards the rotating member 130. Thus, the pushing plate 122 may be in contact with one side (e.g., a side on which the pins 131, 132, 133, 134 protrude) of the rotating member 130 under the biasing force of the tension spring 126 while being pivotal relative to the pedal plate 121.

The second contact surface 122d of the pushing member 122 may have a tapered surface inclined at an appropriate angle so that the horizontal portion 122b of the pushing plate 122 can easily pass over the pins 131, 132, 133, 134. When the horizontal portion 122b of the pushing plate 122 passes over the pin 131, 132, 133, 134 from a lower side of the pin towards an upper side of the pin, the pushing plate 122 may pivot from the rotating member 130. After the horizontal portion 122b of the pushing plate 122 passes over the pins 131, 132, 133, 134, the pushing plate 122 may return to its initial non-pivoted position (e.g., a position where it is in contact with the rotating member 130) by the tension spring 126.

Figure 8:
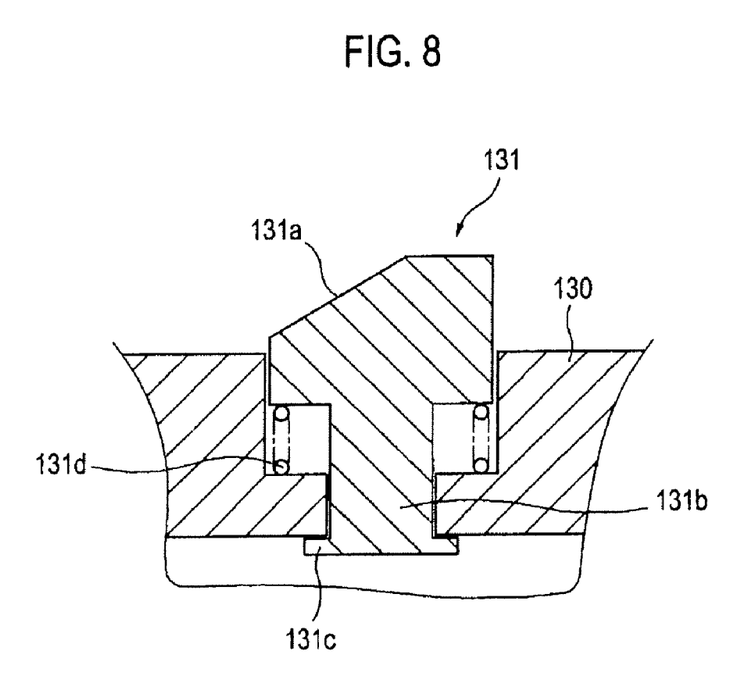
FIG. 8 is a schematic sectional view showing a coupling arrangement between a rotating member and a pin.
Figure 9:
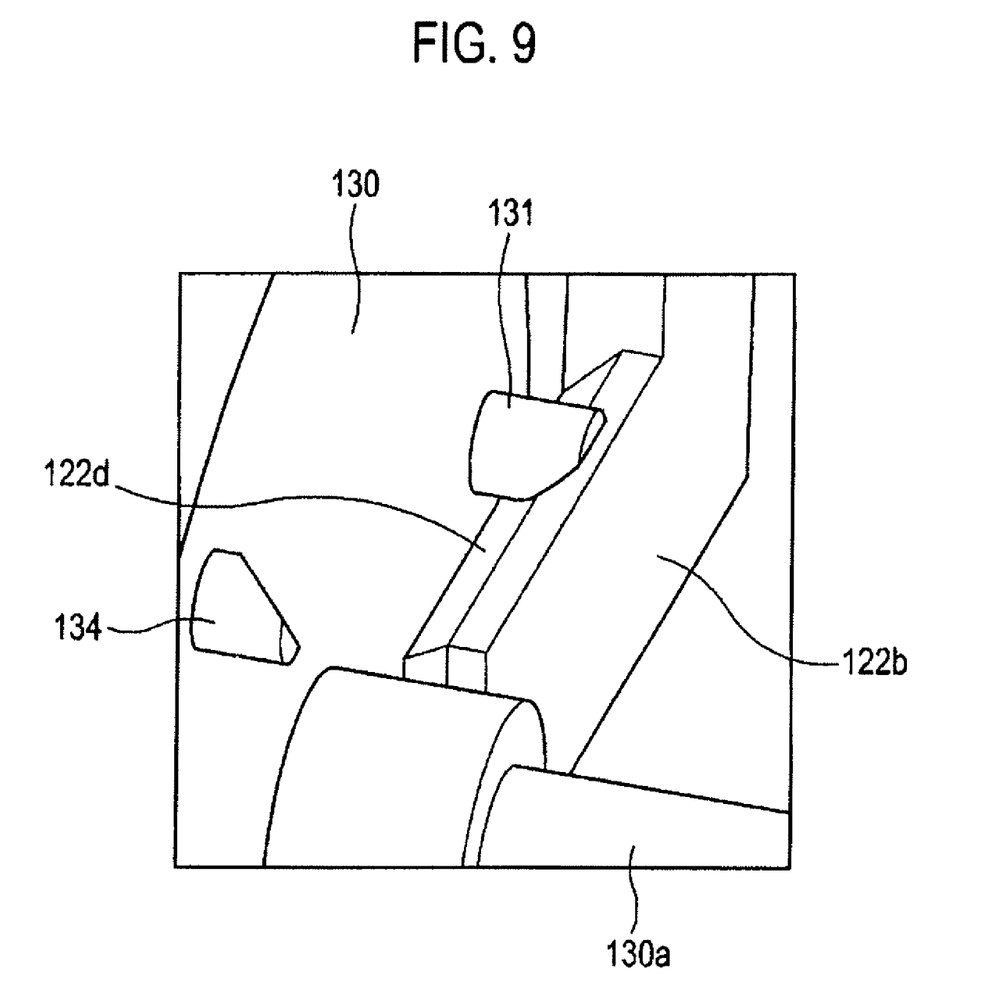
FIGS. 9 to 11 are enlarged perspective views showing contact between the pushing plate and the pin.
Figure 10:
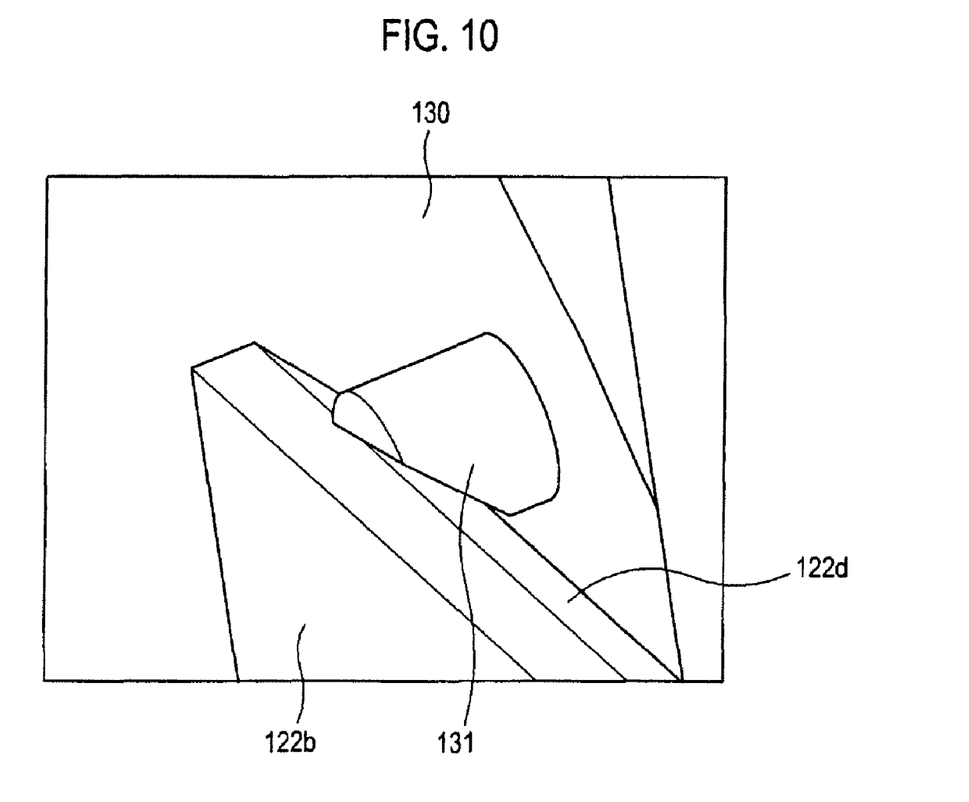
Figure 11:
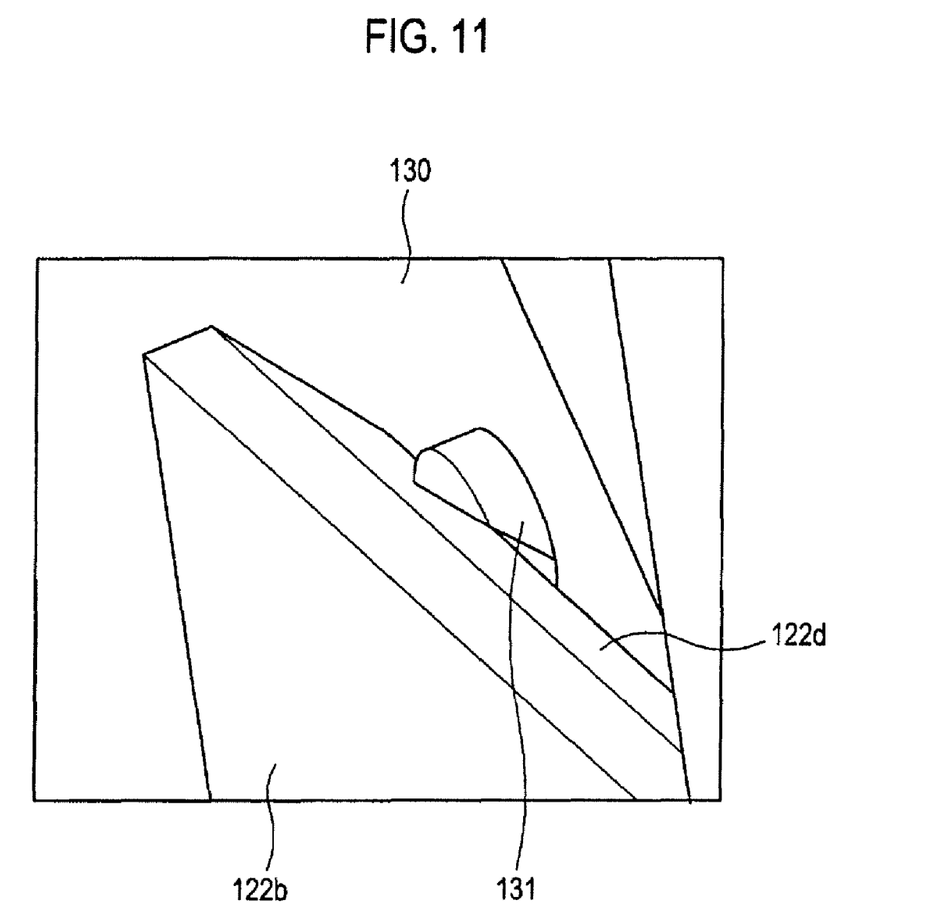

FIG. 8 is a schematic sectional view showing a coupling arrangement between a rotating member and a pin. FIGS. 9 to 11 are enlarged perspective views showing contact between the pushing plate and the pin.

First to fourth pins 131, 132, 133, 134 may be provided in the rotating member 130. The first to fourth pins 131, 132, 133, 134 may be spaced apart from one another at an interval of about 90 degrees about a rotating shaft 130a of the rotating member 130.

The pins 131, 132, 133, 134 may be integrally formed with the rotating member 130 or retractably mounted to the rotating member 130. An example of the latter is illustrated in FIG. 8. Referring to FIG. 8, as an example of a coupling arrangement between the rotating member 130 and the pin 131, the pin 131 may be inserted and mounted to an aperture defined in the rotating member 130. The pin 131 may have an inclined surface 131a, which complementarily contacts the second contact surface 122d of the horizontal portion 122b, at a protruding top end of the pin 131. Further, the pin 131 may have a guide section 131b, a stopper 131c and a compression spring 13Id. The guide section 131b and said aperture may have a polygonal cross-section so as to orient the inclined surface 131a of the pin 131 in a predetermined direction. If the pin 131 is inwardly pressed by the second contact surface 122d, then the pin 131 may be retracted into the rotating member 130 while compressing the compression spring 131d (see FIGS. 10 and 11). If the pushing plate 122 passes over the pin 131 and the pin 131 becomes free from the pressed state, then the pin may return to its initial position by a restoring force of the compression spring 131d. The stopper 131c may prevent the pin 131 from separating from the rotating member 130. The pins 132, 133, 134 may have the same configuration as the pin 131.

Referring back to FIGS. 1 to 3, the rotating member 130 may comprise a circular plate-like or circular disk-like member. The rotating member 130 may be rotatably coupled to the movable object. The pins 131, 132, 133, 134 may protrude from one side of the rotating member 130. In this embodiment, the rotating member 130 may be rotatably coupled to the movable object via a rotating shaft 130a. Further, the rotating member 130 may be coupled to the rotating shaft 130a via a one-way bearing such that it is rotatable in one direction. If the pushing plate 122 moves one of the pins 131, 132, 133, 154 downwardly, then one of the operation modes of the caster 150 may be converted to another operation mode by an interaction between the rotating member 130, the connecting rod 140 and the crank shaft 110.

The connecting rod 140 may be pivotally coupled to the crank pin 113 at its one end and to the opposite side of the rotating member 130 via a joint member 141 at its opposite end. The joint member 141 may include, but is not limited to, a pin-joint, a rivet-joint, etc. As to the coupling positions of the opposite end of the connecting rod 140, referring to FIG. 3, when, for example, the second mode of the caster 150 is set to an initial mode, said coupling position may be determined along a positive X-axis in an X-Y coordinate system that defines an origin as a center of the rotating shaft 130a of the rotating member 130. As another example, if the first mode of the caster 150 is set to the initial mode, then said coupling position may be determined along a positive Y-axis in the X-Y coordinate system.

When the rotating member 130 makes one revolution, the opposite end of the connecting rod 140 may make a circular movement. At this time, the one end of the connecting rod 140 may reciprocatingly pivot about the connecting shaft 111 along a circular arc path, the radius of which is the shortest distance between the crank pin 113 and a line extending from the connecting shaft 111 parallel to the crank pin 113, and a central angle of which is $\theta_1+\theta_2$ (see FIG. 5). The crank pin 113 may also reciprocatingly pivot within the angle $(\theta_1+\theta_2)$ along with the reciprocating pivotal movement of the connecting rod 140. Thus, the connecting shaft 111 and the cam element 155 of the caster 150 may reciprocatingly rotate within the angle $(\theta_1+\theta_2)$. The crank arm 112 in the second mode may form a first angle $\theta_1$ relative to the crank arm 112 in the first mode, while the crank arm 112 in the third mode may form a second angle $\theta_2$ relative to the crank arm 112 in the first mode (see FIG. 5). Degrees of the first and second angles $\theta_1$, $\theta_2$ may be diversely determined when designing the caster 150.

In the caster device 100 of the above-described first embodiment, the caster 150 operates in three modes. Further, four pins 131, 132, 133, 134 are disposed in the rotating member 130 at 90 degrees interval accordingly. However, the present disclosure should not be limited to such modes and pins. For example, if the caster 150 is configured to operate in two or four modes, then it should be appreciated that the number of pins may be two or six so as to permit conversion among the modes.

Hereinafter, an example operation of the caster 150 according to this embodiment is described. In this embodiment, the caster 150 may be initially set to the first mode. The caster device 100 may be configured to convert the first mode to the second mode, the second mode to the first mode second, the first mode to the third mode, and then the third mode to first mode again during one revolution of the opposite end of the connecting rod 140. In describing the example operation below, a rotating direction of the rotating member 130 by the pushing plate 122 is referred to as a clockwise direction. Further, a movement direction of one end of the connecting rod 140 and the crank pin 113 towards the rotating member 130 is referred to as a first direction, while a direction opposite thereto is referred to as a second direction.

In the first mode, the wheel 123 may rotate and the caster 150 may swivel or rotate. Further, in the first mode, the opposite end of the connecting rod 140 is positioned at a right upper side of the rotating shaft 130a of the rotating member 130. If the user presses down the pushing member 120, then the horizontal portion 122b of the pushing plate 122 of the pushing member 120 abuts the first pin 131 to rotate the first pin 131 and the rotating member 130 clockwise. As the rotating member 130 rotates about 90 degrees, the opposite end of the connecting rod 140 coupled to the opposite side of the rotating member 130 rotates clockwise about 90 degrees. Also, the crank pin 113 rotatably coupled to the one end of the connecting rod 140 moves within the first angle $\theta_1$ in the first direction. Then, the connecting shaft 111 rotates counterclockwise within the first angle $\theta_1$. Thus, the cam element 155 coupled to the connecting shaft 111 rotates counterclockwise within the first angle $\theta_1$. The contact portion 156c contacts the second cam surface 155b to move the push rod 156 downwardly and to bring the rubber pad 156a into contact with the wheel 151. Accordingly, the caster 150 goes into the second mode. If the user releases the pushing member 120 from the pressed state, then the horizontal portion 122b of the pushing plate 122 moves upwardly due to the restoring force of the compression spring 124. At this time, as the second contact surface 122d formed on the horizontal portion 122b abuts the inclined surface 131a formed on the first pin 131, the pushing plate 122 pivotally coupled to the pedal plate 121 pivots from the rotating member 130 by an interaction between the second contact surface 122d and the inclined surface 131a (see FIG. 9). Thus, the horizontal portion 122b of the pushing plate 122 passes over the first pin 131 and is then placed above the second pin 132. When the pins are retractably mounted to the rotating member, for example, the first pin 131 may be retracted into the rotating member 130 (see FIG. 10) and the horizontal portion 122b of the pushing plate 122 may pass over the first pin 131 (see FIG. 11) to thereby be placed above the second pin 132.

When in the second mode, if the user presses the pushing member 120 downwardly (similar to the above-described operation mechanism), the opposite end of the connecting rod 140 further pivots clockwise by about 90 degrees, thereby being positioned at a right lower side of the rotating shaft 130a of the rotating member 130. As the opposite end of the connecting rod 140 pivots, the one end of the connecting rod 140 and the crank pin 113 moves within the first angle $\theta_1$ in the second direction to thereby rotate the connecting shaft 111 and the cam element 155 counterclockwise. Thus, the contact portion 156c moves from the second cam surface 155b of the cam element 155 to engage the first cam surface 155a. Then, the push rod 156 moves upwardly and the rubber pad 156a is separated from the wheel 151. Accordingly, the caster 150 returns to the first mode.

In the first mode converted from the second mode, if the user manipulates the pushing member 120, then the opposite end of the connecting rod 140 pivots clockwise by about 90 degrees. Then, along with the pivotal movement of the opposite end of the connecting rod 140, the one end of the connecting rod 140 and the crank pin 113 move within the second angle $\theta_2$ in the second direction to thereby rotate the connecting shaft 111 and the cam element 155 clockwise. Thus, the contact portion 156c moves from the first cam surface 155a of the cam element 155 to engage the third cam surface 155c. The push rod 156 moves upwardly and the engagement piece 156e engages the recess 152a. Accordingly, the caster 150 becomes the third mode.

In the third mode converted from the first mode, if the user manipulates the pushing member 120, then the opposite end of the connecting rod 140 further pivots clockwise by about 90 degrees. Then, along with the pivotal movement of the opposite end of the connecting rod 140, the one end of the connecting rod 140 and the crank pin 113 move within the second angle $\theta_2$ in the first direction to thereby rotate the connecting shaft 111 and the cam element 155 counterclockwise. Thus, the contact portion 156c moves from the third cam surface 155c of the cam element 155 to engage the first cam surface 155a. Thereafter, the push rod 156 moves downwardly and the engagement piece 156e is disengaged from the recess 152a. Accordingly, the caster 150 returns to the initial first mode.

Figure 12:
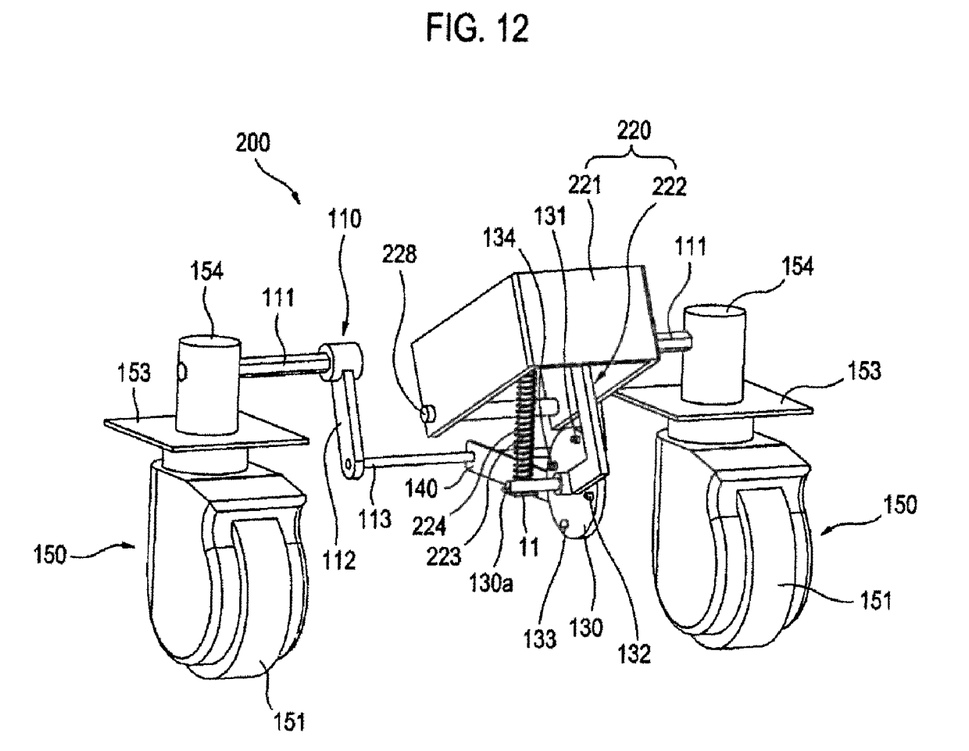
FIG. 12 is a perspective view showing a caster device according to a second embodiment of the present disclosure.

FIG. 12 is a perspective view showing a caster device according to a second embodiment of the present disclosure. The caster device 200 of this embodiment has the same configuration as the caster device 100 of the first embodiment, except the mounting structure of the pushing member. Accordingly, descriptions on the same elements as those of the first embodiment are omitted herein.

Referring to FIG. 12, the caster device 200 according to the second embodiment of the present disclosure may include a pushing member 220 hinge-jointed to the movable object (not shown) via a hinge shaft 228. Specifically, the pushing member 220, may include a pedal plate 221 hinge-jointed to the movable object via the hinge shaft 228 so that the pedal plate 221 may be rotatable about the hinge shaft 228. Further, the pushing member 220 may include a guide rod 223 and a compression spring 224 to resiliently pivot about the hinge shaft 228. While the one end of the guide rod 123 is fixed to the pushing member 120 in the first embodiment (see FIG. 2), a guide rod 223 may be pivotally coupled to the pushing member 220 at its one end via a hinge (not shown). The guide rod 223 may be movably coupled to the bracket 11 of the movable object at its opposite end. The compression spring 224 may be disposed around the guide rod 223 between the pushing member 220 and the bracket 11. As the user pivots the pushing member 220 downwardly, the guide rod 223 pivots while compressing the compression spring 224. If the user releases the pushing member 220 from such pivoted state, then the pushing member 220 pivots upwardly by a restoring force of the compression spring 224. The guide rod 223 may include a stopper (not shown) at its opposite end so as not to be separated from the bracket 11.

Figure 13:
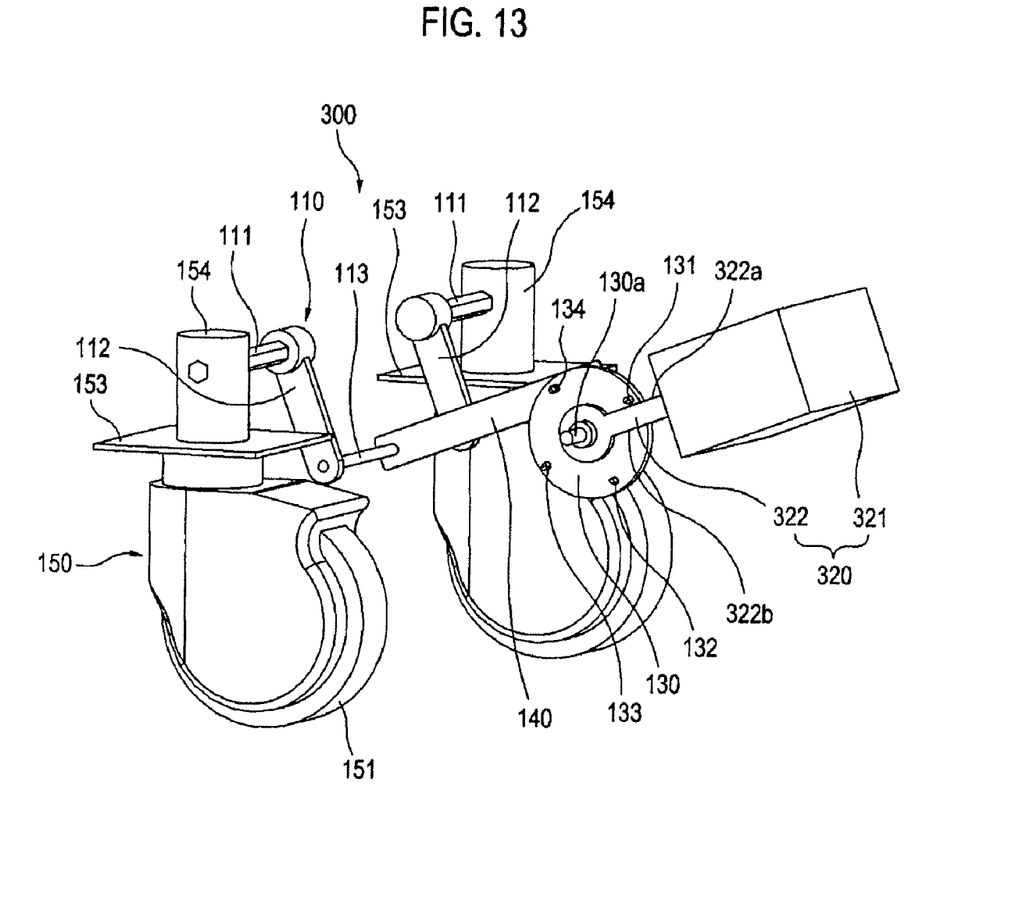
FIG. 13 is a perspective view showing a caster device according to a third embodiment of the present disclosure.

FIG. 13 is a perspective view showing a caster device according to a third embodiment of the present disclosure. The caster device 300 of this embodiment has the same configuration as the caster device 100 of the first embodiment, except the structure of the pushing member. Accordingly, descriptions on the same elements as those of the first embodiment are omitted herein.

Referring to FIG. 13, the caster device 300 according to the third embodiment of the present disclosure may include a pushing member 320 having a pivotal bar 322 that is rotatably coupled to the rotating shaft 130a at its one end and is coupled to a pedal plate 321 at its opposite end. Further, the pivotal bar 322 may include: a first contact surface 322a that contacts the pins 131, 132, 133, 134 during a downward pivotal movement of the pushing member 320; and a second contact surface 322b that contacts the pins 131, 132, 133, 134 during an upward pivotal movement of the pushing member 320. The first contact surface 322a of the pivotal bar 322 may comprise a lower edge of the pivotal bar 322, while the second contact surface 322b of the pivotal bar 322 may comprise an upper edge of the pivotal bar 322. The second contact surface 322b may have a tapered surface inclined towards the rotating member 130 similarly to the second contact surface 122d of the first embodiment (see FIG. 6).

Also, the caster device 300 of this embodiment may further include a torsion spring (not shown) connected to the movable object and the pivotal bar 322 for biasing the pivotal bar 322 upwardly. The pivotal bar 322 may be configured to rotate clockwise to thereby compress the torsion spring. The pivotal bar 322 may rotate counterclockwise to return to its initial position by a restoring force of the torsion spring. The torsion spring may be coupled between the pivotal bar 322 and the rotating shaft 130a in any known manner. For example, the torsion spring may be fixed to the pivotal bar 322 at its one end and to the rotating shaft 130a at its opposite end. Further, a tension spring (not shown) may be interposed between the pivotal bar 322 and the rotating member 130, thereby elastically biasing the pivotal bar 322 towards the rotating member 130. This may cause the same effect as the resilient bias of the pushing plate 122 in the first embodiment (see FIG. 6).

According to the caster devices of the present disclosure, the user can continuously or intermittently change the operating modes of the casters 150 by moving or pivoting the pushing member 120, 220, 320 in one direction. Accordingly, the user can change, the operating modes of the casters in a short time without confusing the operating modes. Further, the conversion of the operating modes can be performed in one cycle made by one revolution of the rotating member 130, thereby allowing the user to easily convert the operating modes.

Although embodiments have been described with reference to a number of illustrative embodiments thereof, it should be understood that various other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A caster device, comprising:
   a caster including a reciprocatingly rotatable cam element, the caster being coupled to a movable object;
   a crank shaft coupled to the cam element;
   a rotating member rotatably coupled to the movable object, the rotating member having a plurality of pins spaced apart from one another along a circumferential direction;
   a pushing member for rotating the rotating member, the pushing member being vertically movably coupled to the movable object; and
   a connecting rod for connecting the crank shaft and the rotating member,
   wherein the connecting rod and the crank shaft convert rotation of the rotating member caused by movement of the pushing member into reciprocating rotation of the cam element,
   wherein the pins are retractably mounted to the rotating member, and
   wherein each of the pins includes a tapered surface contacting the pushing member at a top end thereof.

2. The caster device of claim 1, wherein the pushing member includes
   a pushing plate having a first contact surface and a second contact surface, the first contact surface being brought into contact with one of the pins during downward movement of the pushing member, and the second contact surface being brought into contact with one of the pins during upward movement of the pushing member.

3. The caster device of claim 2, wherein the pushing plate includes a vertical portion and a horizontal portion extending from the vertical portion.

4. The caster device of claim 3, wherein the second contact surface comprises an upper flat surface and a tapered surface.

5. A caster device, comprising:
   a caster including a reciprocatingly rotatable cam element, the caster being coupled to a movable object;
   a crank shaft coupled to the cam element;
   a rotating member rotatably coupled to the movable object, the rotating member having a plurality of pins spaced apart from one another along a circumferential direction;
   a pushing member for rotating the rotating member, the pushing member being vertically movably coupled to the movable object; and
   a connecting rod for connecting the crank shaft and the rotating member,
   wherein the connecting rod and the crank shaft convert rotation of the rotating member caused by movement of the pushing member into reciprocating rotation of the cam element,
   wherein the pushing member includes a pushing plate having a first contact surface and a second contact surface, the first contact surface being brought into contact with one of the pins during downward movement of the pushing member, and the second contact surface being brought into contact with one of the pins during upward movement of the pushing member, and
   wherein the pushing member further includes a spring for biasing the pushing plate towards the rotating member.

6. A caster device, comprising:
   a caster including a reciprocatingly rotatable cam element, the caster being coupled to a movable object;
   a crank shaft coupled to the cam element;
   a rotating member rotatably coupled to the movable object, the rotating member having a plurality of pins spaced apart from one another along a circumferential direction;
   a pushing member for rotating the rotating member, the pushing member being vertically movably coupled to the movable object; and
   a connecting rod for connecting the crank shaft and the rotating member,
   wherein the connecting rod and the crank shaft convert rotation of the rotating member caused by movement of the pushing member into reciprocating rotation of the cam element,
   wherein the pushing member includes a pushing plate having a first contact surface and a second contact surface, the first contact surface being brought into contact with one of the pins during downward movement of the pushing member, and the second contact surface being brought into contact with one of the pins during upward movement of the pushing member, and
   wherein the pushing member further includes:
   a guide rod vertically movably disposed on the movable object; and
   a compression spring disposed around the guide rod.

7. The caster device of claim 6, wherein the pushing member is hinge-jointed to the movable object.

8. The caster device of claim 1, wherein the pushing member includes a pivotal bar pivotally coupled to the movable object and having a first contact surface and a second contact surface, the first contact surface being brought into contact with one of the pins during downward movement of the pushing member, the second contact surface being brought into contact with one of the pins during upward movement of the pushing member.

9. The caster device of claim 8, further comprising a spring disposed between the movable object and the pivotal bar for biasing the pivotal bar upwardly.

10. The caster device of claim 2, wherein the pushing member includes a pedal plate, the pushing plate being pivotally coupled to the pedal plate.

11. The caster device of claim 1, wherein the caster further includes a push rod configured to be vertically moved at different levels in a plurality of operating modes according to the rotation of the cam element.

* * * * *